(12) United States Patent
Wenger

(10) Patent No.: US 8,285,317 B2
(45) Date of Patent: Oct. 9, 2012

(54) PROACTIVE APPLICATION COMMUNICATIONS

(75) Inventor: Scott Wenger, Cary, NC (US)

(73) Assignee: Sony Mobile Communications AB, Lund (SE)

( * ) Notice: Subject to any disclaimer, the term of this patent is extended or adjusted under 35 U.S.C. 154(b) by 379 days.

(21) Appl. No.: 12/580,575

(22) Filed: Oct. 16, 2009

(65) Prior Publication Data

US 2011/0092230 A1   Apr. 21, 2011

(51) Int. Cl.
    *H04B 7/00* (2006.01)
(52) U.S. Cl. ....... 455/519; 455/466; 455/41.2; 455/420; 455/550.1; 463/42
(58) Field of Classification Search .......... 455/518–519, 455/466, 414.3, 456.3, 41.2; 463/39, 42
    See application file for complete search history.

(56) References Cited

U.S. PATENT DOCUMENTS

| | | | |
|---|---|---|---|
| 6,527,641 B1 * | 3/2003 | Sinclair et al. | 463/39 |
| 6,837,793 B2 * | 1/2005 | McClintic | 463/42 |
| 6,908,389 B1 * | 6/2005 | Puskala | 463/40 |
| 6,947,761 B2 * | 9/2005 | Hutcheson et al. | 455/518 |
| 7,618,325 B2 * | 11/2009 | Yamada et al. | 463/42 |
| 7,729,661 B2 * | 6/2010 | Tanaka et al. | 455/41.2 |
| 8,112,817 B2 * | 2/2012 | Chiruvolu et al. | 726/30 |
| 2002/0082923 A1 | 6/2002 | Merriman et al. | |
| 2004/0185881 A1 * | 9/2004 | Lee et al. | 455/466 |
| 2005/0277474 A1 | 12/2005 | Barry | |
| 2006/0168001 A1 | 7/2006 | Lasater et al. | |
| 2008/0146334 A1 * | 6/2008 | Kil | 463/36 |
| 2009/0177484 A1 | 7/2009 | Davis et al. | |
| 2010/0069035 A1 * | 3/2010 | Johnson | 455/404.1 |
| 2010/0197409 A1 * | 8/2010 | Van Luchene | 463/42 |

FOREIGN PATENT DOCUMENTS

| | | |
|---|---|---|
| WO | WO 2007/122238 | 11/2007 |
| WO | WO 2009/077901 | 6/2009 |

OTHER PUBLICATIONS

International Search Report and Written Opinion dated Dec. 10, 2010 issued in corresponding PCT application No. PCT/US2010/052424, 12 pages.
International Preliminary Report on Patentability dated Apr. 17, 2012 issued in corresponding PCT application No. PCT/US2010/052424, 8 pages.

* cited by examiner

*Primary Examiner* — Sharad Rampuria
(74) *Attorney, Agent, or Firm* — Snyder, Clark, Lesch & Chung, LLP

(57) ABSTRACT

A device may include a contact information database and a processor. The processor may interact with a participant in a session with an application, obtain information that is associated with the session, generate a message based on the obtained information after the session terminates, obtain a list of contacts that includes at least one of the participant and members in the contact information database, and send the message to a first one of the contacts, the message providing information to motivate one of the contacts to join a future session with the application.

20 Claims, 8 Drawing Sheets

PROACTIVE APPLICATION COMMUNICATIONS

BACKGROUND

Typical user-to-user communications include text messaging, sending/receiving emails, posting/reading messages at a blog site, and/or placing/receiving phone calls.

SUMMARY

According to one aspect, a device may include a contact information database; and a processor. The processor may interact with a participant in a session with an application, obtain information that is associated with the session, generate a message based on the obtained information after the session terminates, obtain a list of contacts that includes at least one of the participant and members in the contact information database, and send the message to a first one of the contacts, the message providing information to motivate one of the contacts to join a future session with the application.

Additionally, the message may include at least one of an audio clip, a video clip, a text message, or an email.

Additionally, the device may include a game console, a netbook, a laptop, a personal computer, or a server device.

Additionally, the device may include a cellular telephone or a personal digital assistant, and the contact information database may include at least one of an address book or a phone book.

Additionally, the contact information database may include at least one of a telephone number, an email address, a network address, or a uniform resource locator.

Additionally, the application may include at least one of a game or an online order entry program.

Additionally, the message may include at least one of: a request for the participant to join a game session; a challenge to the participant to defeat a character in a game; a description of how the participant was defeated by a character in a role playing game; a description of a type of product that the participant purchased during the session; or an electronic discount coupon.

Additionally, the obtained information may include at least one of an email address, a name of a character within the application, a time of the session, duration of the session, an outcome of the participant facing an obstacle in a game during the session, or a product description.

Additionally, before the processor sends the message, the processor may be further configured to select a time for sending the message based on the time of the session.

Additionally, before the processor sends the message, the processor may be further configured to call a communication application program interface to send the message.

According to another aspect, a method may include interacting with a participant in a first session with a game application installed on a device, obtaining information that is associated with the first session, generating a message based on the obtained information, obtaining a list of contacts based on at least one of a phone book of the participant or an address book of the participant, and sending the message to a first one of the contacts, the message providing information to motivate one of the contacts to join a future session with the game application.

Additionally, the method may further include collecting, during the first session, at least one of state information of the game application or state information associated with the device, and determining whether to send the message to the first one of the contacts, by comparing the collected state information to current state information of the device or the game application.

Additionally, generating the message may include inserting a challenge or taunt inside the message.

Additionally, sending the message may include sending an audio clip or a video clip.

Additionally, obtaining the information may include obtaining a name of a character whose role the participant assumed during the first session.

Additionally, the method may further include sending messages to other participants in the first session.

According to yet another aspect, a computer-readable medium may store computer-executable instructions. The computer-executable instruction may include instructions for interacting with a participant in a session, obtaining information that is associated with the session, generating a message based on the obtained information after the session terminates, and presenting the message to the participant to motivate the participant to join a future session.

Additionally, the session may include a commercial transaction or a gaming session.

Additionally, the instructions for sending the message may include instructions for at least one of playing an audio clip or a video clip, displaying an email message, a text message, or a short messaging service (SMS) message, or emulating a phone call.

Additionally, the computer-readable readable medium may further include instructions for: collecting, during the session, state information of a device that includes the computer-readable medium; and comparing the collected state information to current state information to determine whether to present the message.

BRIEF DESCRIPTION OF THE DRAWINGS

The accompanying drawings, which are incorporated in and constitute a part of this specification, illustrate one or more embodiments described herein and, together with the description, explain the embodiments. In the drawings.

DETAILED DESCRIPTION

The following detailed description refers to the accompanying drawings. The same reference numbers in different drawings may identify the same or similar elements. As used herein, the term "game" or "computer game" may refer to a game played on a computer (e.g., a personal computer, a laptop, etc.), game station (e.g., game console), or mobile device (e.g., cellular phone). In some implementations of a computer game, the user may interact with other users over a network via computers, game stations, or mobile devices.

Figure 1:
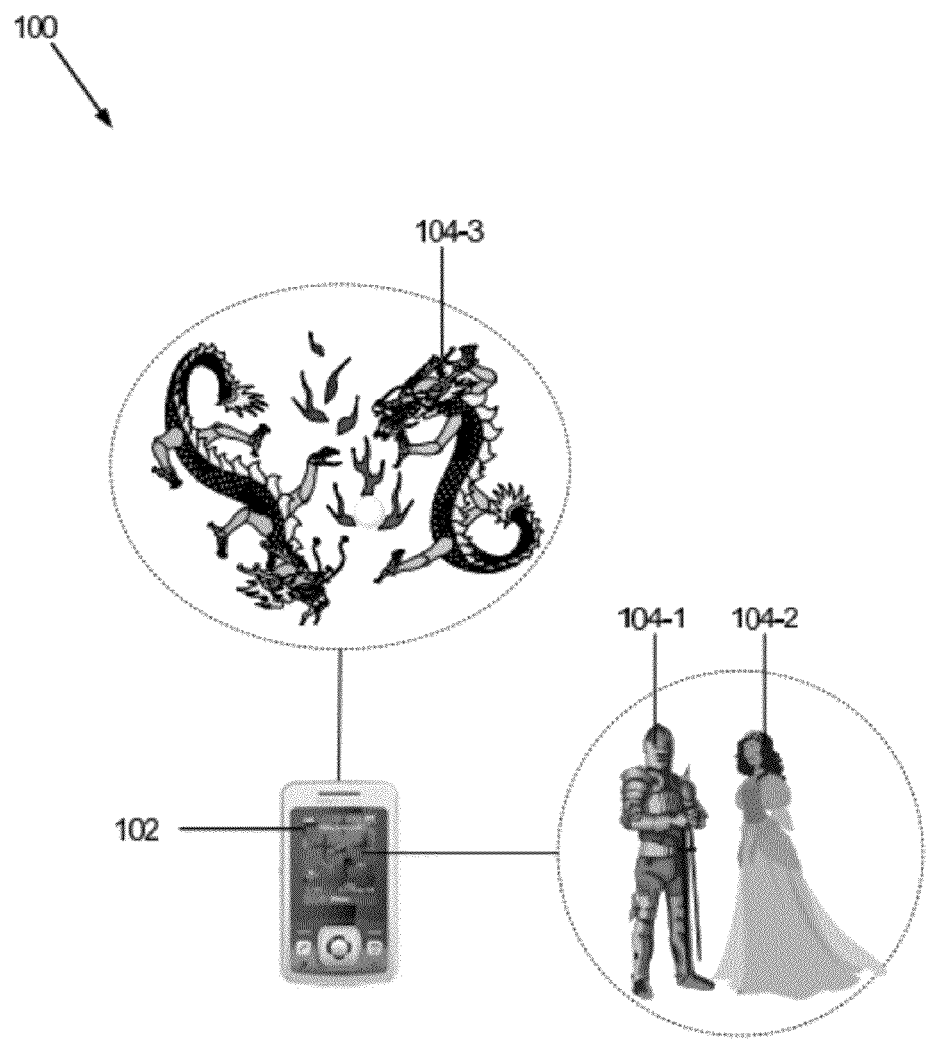
FIG. 1 illustrates concepts described herein.

In the following, a device may allow an application hosted on the device to initiate a communication with a user of the device and/or other users that have engaged the user via the application over a network. FIG. 1 illustrates an exemplary implementation of the above concept. Assume that a user Scott has concluded a role-playing session in a game Dragons of the Misty Mountains at user device 102. Further, assume that, during the session, Scott has acted the role of Knight Macduff 104-1, and saved Princess Juliette 104-2 from Dragon King 104-3.

A few days after the session, game Dragons of the Misty Mountains may "call" (e.g., texting instant messaging, mimicking/emulating a telephone call, etc.) user device 102. This may cause device 102 to provide a ringtone and/or to display the name "Dragon King" and/or an image of Dragon King 104-3. If Scott accepts the call, Dragons of the Misty Mountains may, for example, encourage Scott to continue to play the game, challenge Scott to additional gaming sessions, or taunt Scott for "quitting." If Scott does not accept the call, the call may be forwarded to Scott's voicemail.

Figure 2:
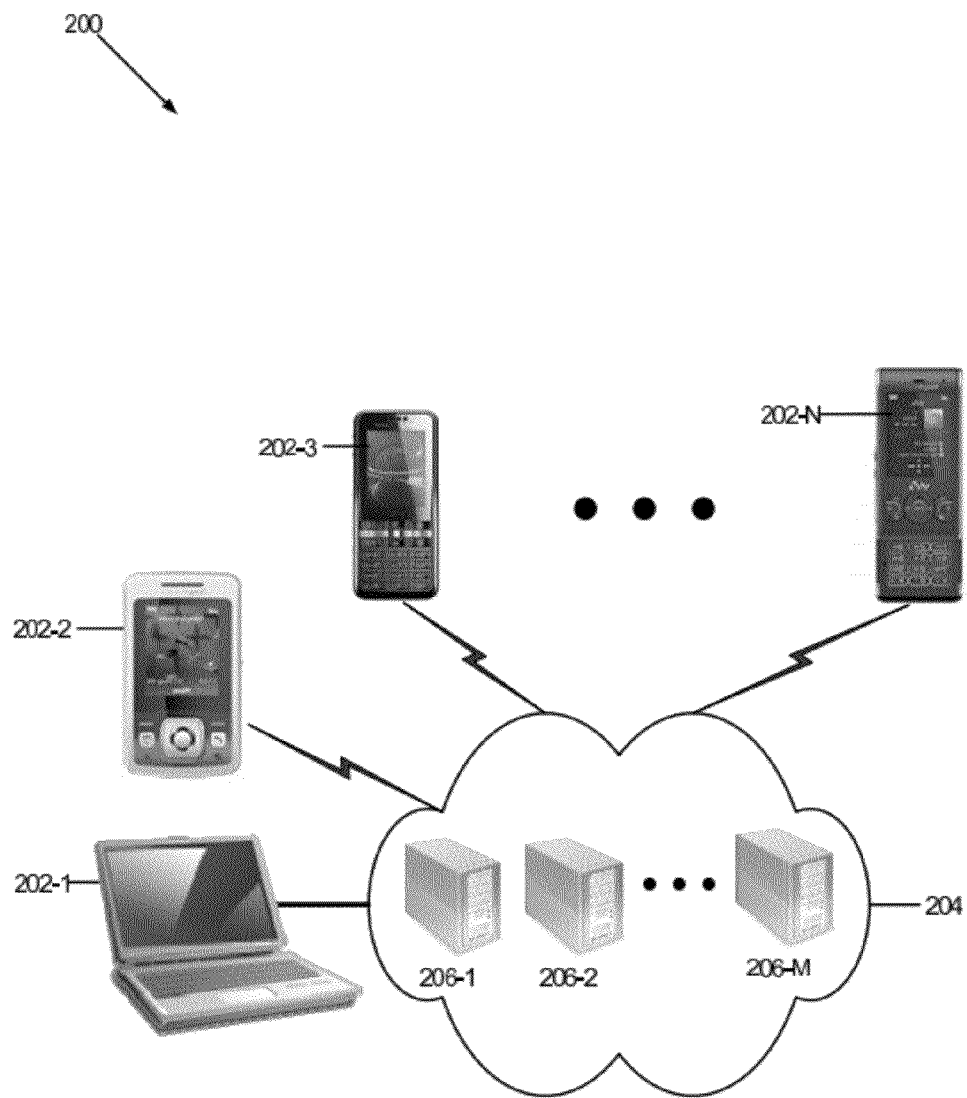
FIG. 2 is a diagram of an exemplary network in which the concepts described herein may be implemented.

FIG. 2 is a diagram of an exemplary network 200 in which the concepts described herein may be implemented. As shown, network 200 may include user devices 202-1 through 202-N (collectively "user devices 202" and individually "user device 202-$x$"), network 204, and server devices 206-1 through 206-M (collectively "server devices 206" and individually "server device 206-$x$"). Depending on the implementation, network 200 may include additional, fewer, or different devices than the ones illustrated in FIG. 2. For example, in some implementations, network 200 may include hundreds, thousands, or more user devices.

User device 202-$x$ may invite or request the user to perform an action (e.g., challenge the user to play a game). In some implementations, user device 202-$x$ may send or receive invitations/information to/from other user devices 202 and/or server devices 206. The invitations may request the users and/or other users to participate in a network activity (e.g., a network game, purchase a product or food (e.g., lunch) over the network, etc.), as well as present the user with useful information (e.g., a lunch menu at the user's favorite restaurant).

Network 204 may include a cellular network, a public switched telephone network (PSTN), a local area network (LAN), a wide area network (WAN), a wireless LAN, a metropolitan area network (MAN), an intranet, the Internet, a satellite-based network, a fiber-optic network (e.g., passive optical networks (PONs)), an ad hoc network, any other network, or a combination of networks. Devices that are shown in FIG. 2 may connect to network 204 via wireless, wired, or optical communication links. In addition, network 204 may allow any of devices 202 to communicate with any other devices 202.

Server device 206-$x$ may invite or request one or more users at user devices 202 to perform an action (e.g., challenge the user to play a game) and/or present the users with useful information (e.g., a menu at a user's favorite restaurant).

In some implementations, server device 206-$x$ may exchange information about the users and/or user devices 202 with other server devices 206. For example, assume that John at user device 202-1 is playing a network game hosted at server device 206-1, and Ben at user device 202-2 is playing the same game hosted at server device 206-2. Server devices 202-1 and 202-2 may continually exchange game information pertaining to John and Ben to allow John and Ben to interact in the game.

Figure 3:
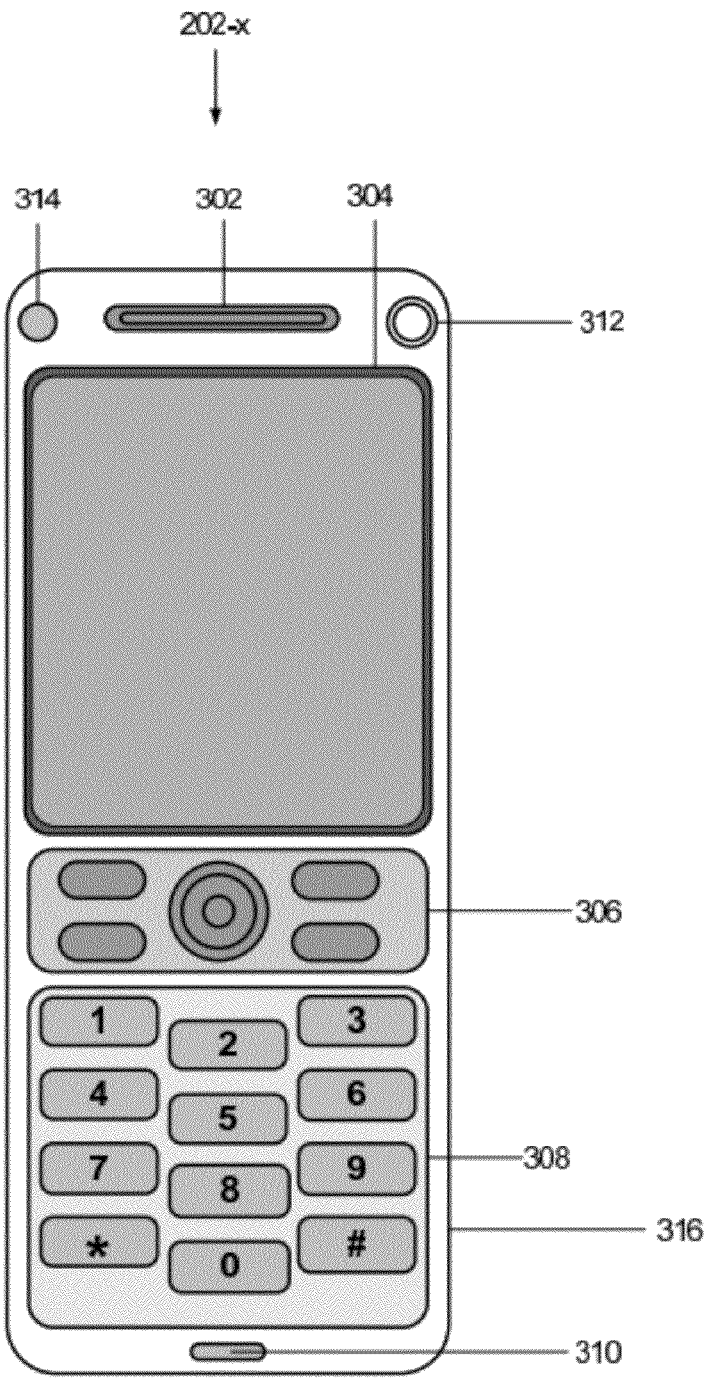
FIG. 3 is a diagram of an exemplary user device of FIG. 2.

FIG. 3 is a diagram of an exemplary user device 202-$x$. User device 202-$x$ may include any of the following devices: a mobile telephone; a cellular phone; a personal communications system (PCS) terminal that may combine a cellular radiotelephone with data processing, facsimile, and/or data communications capabilities; an electronic notepad, a laptop, a netbook, an ultra mobile personal computer (UMPC), and/or a personal computer; a personal digital assistant (PDA) that can include a telephone; a gaming device or console; a peripheral (e.g., wireless headphone); a digital camera; or another type of computational or communication device.

In this implementation, user device 202-$x$ may take the form of a mobile phone (e.g., a cell phone). As shown in FIG. 3, user device 202-$x$ may include a speaker 302, a display 304, control buttons 306, a keypad 308, a microphone 310, sensors 312, a front camera 314, and a housing 316.

Speaker 302 may provide audible information to a user of user device 202-$x$. Display 304 may provide visual information to the user, such as an image of a caller, video images, or pictures. In addition, display 304 may include a touch screen for providing input to user device 202-$x$. Control buttons 306 may permit the user to interact with user device 202-$x$ to cause user device 202-$x$ to perform one or more operations, such as place or receive a telephone call. Keypad 308 may include a telephone keypad. Microphone 310 may receive audible information from the user. Sensors 312 may collect and provide, to user device 202-$x$, information (e.g., acoustic, infrared, etc.) that is used to aid the user in capturing images or in providing other types of information (e.g., a distance between a user and user device 202-$x$). Front camera 314 may enable a user to view, capture and store images (e.g., pictures, video clips) of a subject in front of user device 202-$x$. Housing 316 may provide a casing for components of user device 202-$x$ and may protect the components from outside elements.

Figure 4:
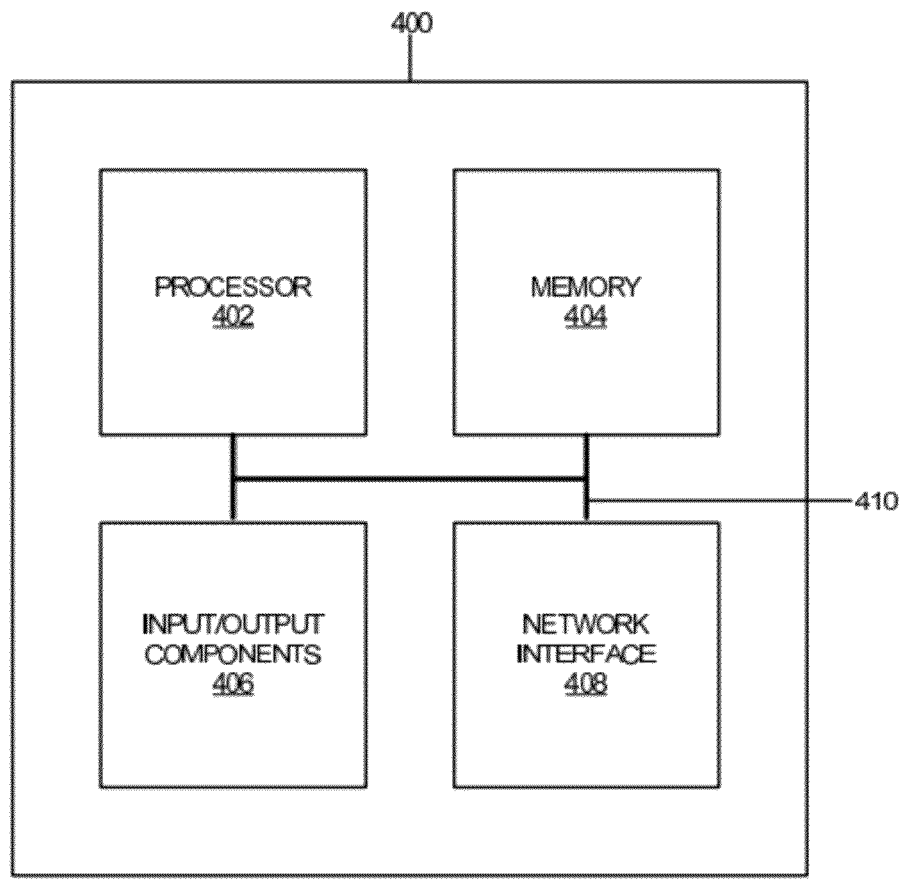
FIG. 4 is a block diagram of an exemplary network device.

FIG. 4 is a block diagram of a network device 400, which may represent any of devices 202 and 206. As shown in FIG. 4, network device 400 may include a processor 402, a memory 404, input/output components 406, a network interface 408, and a communication path 410. In different implementations, device 400 may include additional, fewer, or different components than the ones illustrated in FIG. 4. For example, device 400 may include additional network interfaces, such as interfaces for receiving and sending data packets.

Processor 402 may include a processor, a microprocessor, an Application Specific Integrated Circuit (ASIC), a Field Programmable Gate Array (FPGA), and/or other processing logic (e.g., audio/video processor) capable of processing information and/or controlling network device 400. Memory 404 may include static memory, such as read only memory (ROM), and/or dynamic memory, such as random access memory (RAM), or onboard cache, for storing data and machine-readable instructions. Memory 404 may also include storage devices, such as a floppy disk, CD ROM, CD read/write (R/W) disc, and/or flash memory, as well as other types of storage devices.

Input/output components 406 may include a display screen (e.g., display 304, etc.), a keyboard, a mouse, a speaker, a microphone, a Digital Video Disk (DVD) writer, a DVD reader, Universal Serial Bus (USB) lines, and/or other types of components for converting physical events or phenomena to and/or from digital signals that pertain to network device 400.

Network interface 408 may include any transceiver-like mechanism that enables network device 400 to communicate with other devices and/or systems. For example, network interface 408 may include mechanisms for communicating via a network, such as the Internet, a terrestrial wireless network (e.g., a WLAN), a cellular network, a satellite-based network, a wireless personal area network (WPAN), etc. Additionally or alternatively, network interface 308 may include a modem, an Ethernet interface to a LAN, and/or an interface/connection for connecting network device 400 to other devices (e.g., a Bluetooth interface).

Communication path 410 may provide an interface through which components of network device 400 can communicate with one another.

Figure 5:
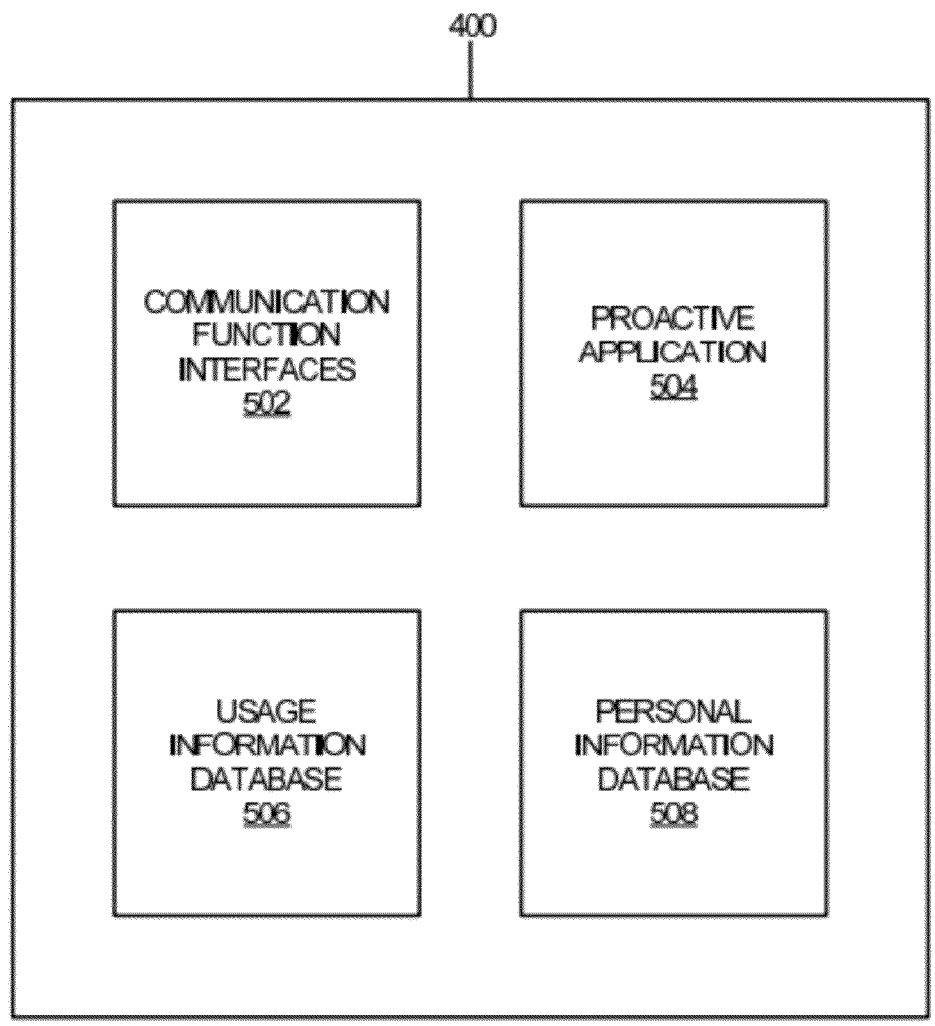
FIG. 5 is a block diagram of exemplary functional components of the network device of FIG. 4.

FIG. 5 is a block diagram of exemplary functional components of network device 400. Network device 400 may represent either user device 202-*x* or server device 206-*x*. As shown, network device 400 may include communication function interfaces 502, a proactive application 504, a usage information database 506, and a personal information database 508. Depending on the implementation, network device 400 may include additional, fewer, or different functional components than those illustrated in FIG. 5. For example, network device 400 may include an operating system, document application, game application, etc.

Communication function interfaces 502 may include hardware and/or software interfaces for requesting and obtaining functionalities that are association with communication applications (e.g., an email client, a short messaging service (SMS) client, an instant messaging application, a browser, a telephone application, a video chat application, etc.) from network device 400. Another application, such as proactive application 504, may use communication function interfaces 502 to cause network device 400 to generate a ringtone, display a message, deliver a message (e.g., SMS message, email, IM message, browser page, etc.) from/to another user, game server, etc.

Proactive application 504 may include hardware and/or software components for interacting with a user of user device 202-*x* to perform tasks, collecting usage information pertaining to proactive application 504 (e.g., the time and the duration of the user's interaction with proactive application 504), and using the collected information to perform proactive actions, such as requesting the user to play a game, inviting the user to a gathering (e.g., a lunch at Joe's Pizza), informing the user of a special sale at the user's favorite retail store, calling/messaging the user's contacts, etc.

Depending on the implementation, proactive application 504 may include, for example, an application for receiving an order (e.g., order for lunch, a product, providing a reservation, etc.), a game application (e.g., a role playing game, a video game, etc.), an application for tracking a user's visits to different websites, etc.

Usage information database 506 may include records that pertain to use of proactive application 504. For example, assume that proactive application 504 is an application for receiving an online order (e.g., a lunch order, a product (e.g., a pair of shoes) order, concert ticket order, etc.). In such a case, a record in usage information database 506 may include a caller's email address, phone number, and/or the caller's order selection (e.g., lunch selection, a specific product, the time-day-month of the order, etc.). In another example, assume that proactive application 504 is a game. In this case, the record may indicate how long the user played the game, characters that the user defeated or obstacles that the user overcame, the number of points that the user accumulated, the time-day-month of each of game sessions, other users that the user of device 202-*x* interacted with via the game, etc. Personal information database 508 may include contact information associated with the users of devices 202 (e.g., phone numbers, email addresses, etc.).

Figure 6:
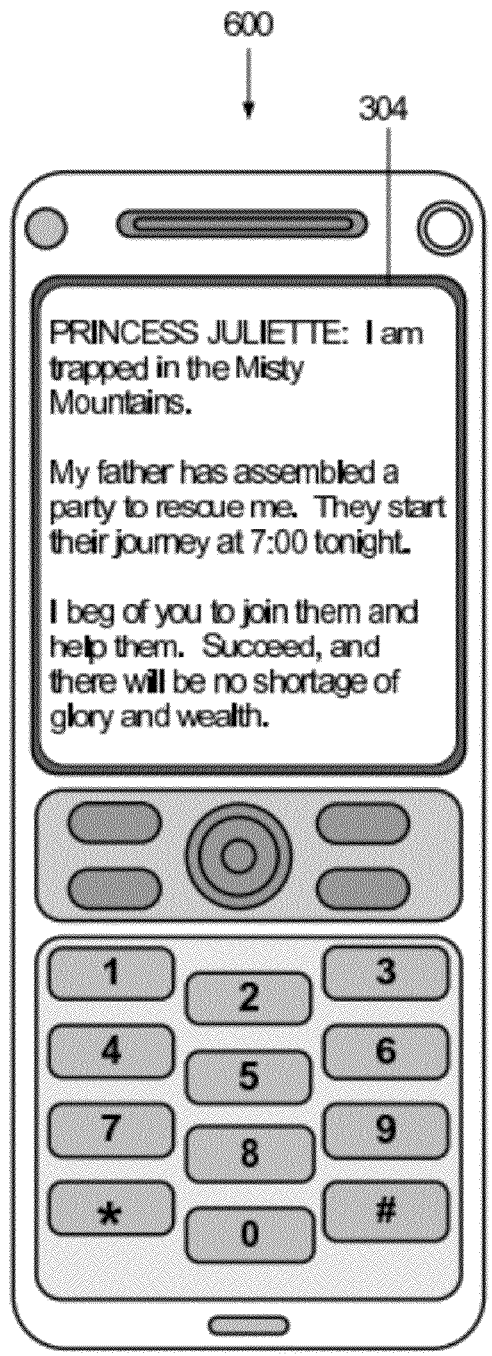
FIG. 6 is illustrates the user device of FIG. 2 receiving an exemplary text message from a proactive application of FIG. 5.

FIG. 6 is illustrates user device 202-*x* receiving a text message from proactive application 504. As shown, Princess Juliette in Dragons of the Misty Mountains has sent a message to a user of user device 202-*x*. Further, as shown, a text message that is shown on display 304 requests the user to play starting at 7:00 p.m.

Exemplary Processes

Figure 7:
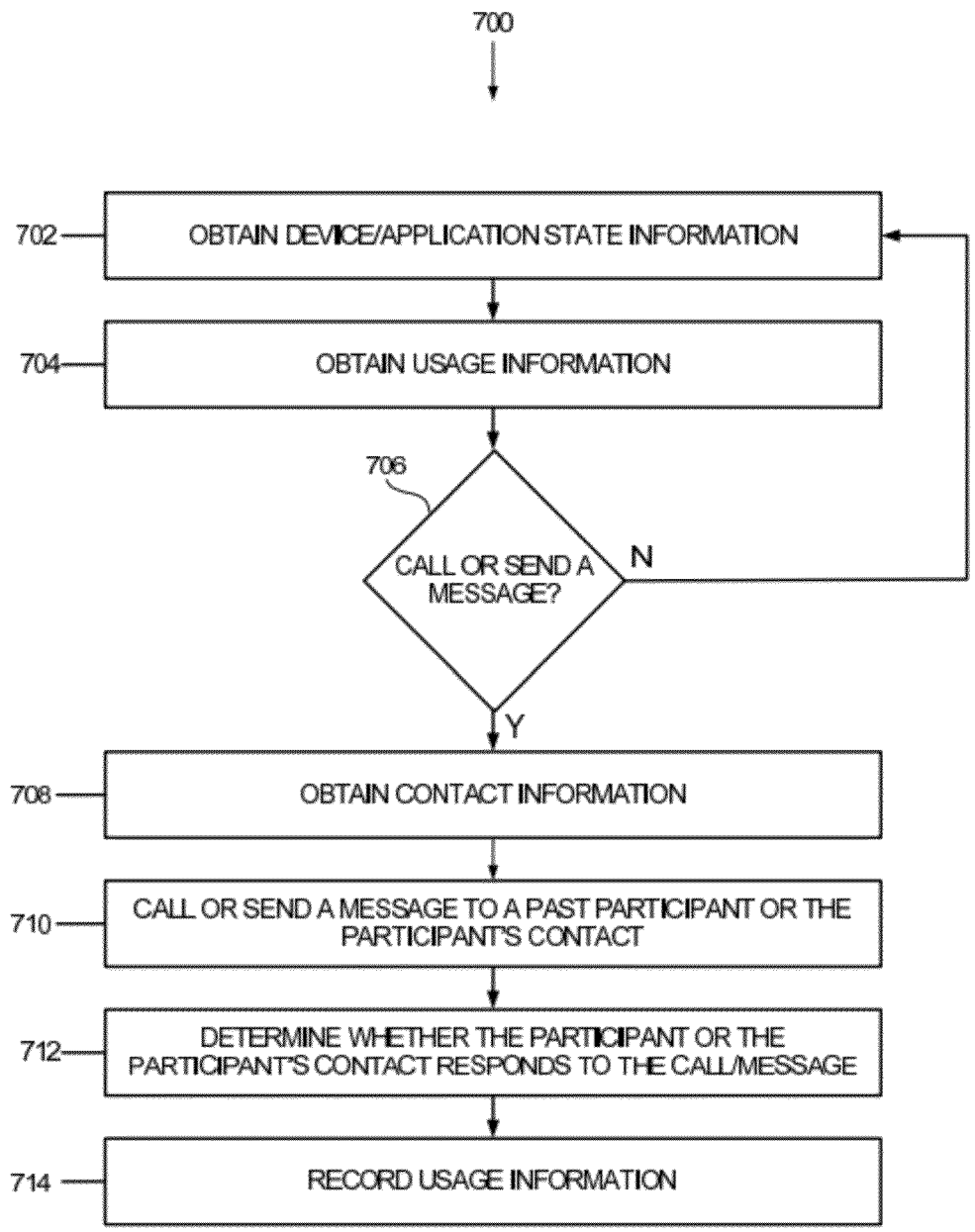
FIG. 7 is a flow diagram of an exemplary process that is associated with the network device of FIG. 4.

FIG. 7 is a flow diagram of an exemplary process 700 that is associated with network device 400. Assume that proactive application 504 is running on either user device 202-*x* or server device 206. Process 700 may begin with proactive application 504 obtaining state information of user device 202-*x* or proactive application 504 (block 702). For example, proactive application 504 may obtain the current time and the location of user device 202-*x* (e.g., based on output of global positioning system (GPS) application on user device 202-*x*), the load on processor 402, identities of other applications that are executing on user device 202-*x*/server device 206, etc.

Proactive application 504 may obtain usage information (block 704). For example, proactive application 504 may obtain times, days, and/or locations at which proactive application 504 interacted with a user. For example, assume that proactive application 504 is a game. Proactive application 504 may retrieve the times/days during which a user played the game. In another example, assume that proactive application 504 is an online provisioning program that is hosted at server device 206. Proactive application 504 may retrieve information on times/days during which the user shopped via proactive application 504.

Proactive application 504 may determine whether to call or send a message to a past participant or the past participant's contacts (block 706). For example, proactive application 504 may determine, based on the state information (see block 702) and the usage information (see block 704), that the current state of user device 202-*x* or proactive application 504 matches the usage information. For example, assume that proactive application 504 is a game. When the current time approximately matches one of the times/days during which the user played proactive application 504, proactive application 504 may decide to contact/alert the user. In some implementations, proactive application 504 may obtain the participant's authorization before contacting the user. In another example, assume that the location of user device 202-*x* matches the location at which another user of user device 202-*y* previously interacted with user device 202-*x*. This in turn may cause proactive application 504 to send an alert to user device 202-*y*.

If proactive application 504 includes an application for promoting sales, proactive application 504 may weigh additional information, such as at what price the user purchased a particular product, whether the current product on sale is the type of product the user purchased, whether today is close to the date of the sale, etc. If there is a significant match between the usage information and the additional information, proactive application 504 may determine that the user should be alerted or notified.

For example, assume that proactive application 504 takes online orders for lunch. In addition, assume that proactive application 504 has received an order for seafood pasta from John on a prior Wednesday at 1:00 p.m. In such an instance, on the following Wednesday, proactive application 504 may determine that that an email notification should be sent to John at 11:00 a.m. based on John's past lunch orders, to alert John to a slightly different or the same lunch special.

In some instances, proactive application 504 may determine that the current state of user device 202-*x* does not warrant interruptions from proactive application 504. For example, the user may be engaged in work (e.g., inputting data at an accounting application). In another example, processor 402 of user device 202-x may be heavily loaded, and placing proactive application as a foreground process may cause user device 202-x to be irresponsive to user input. In these instances, proactive application 504 may decide against alerting and/or sending a message to the user.

If proactive application 504 determines that the participant/contacts are not to be contacted (block 706—NO), proactive application 504 may return to block 702, where proactive application 504 may continue to monitor the state of proactive application 504 or user device 202-x. If proactive application 504 determines that the past participant/contacts are to be contacted (block 706—YES), proactive application 504 may obtain contact information (block 708).

In obtaining the contact information, proactive application 504 may perform one or more lookups in personal information database 508. For example, assume that John has played Dragons of the Misty Mountains. In this case, proactive application 504 may obtain email addresses, phone numbers, and/or other contact information for John's friends from personal information database 508. John's friends may or may not have played Dragons of the Misty Mountains. In another example, proactive application 504 may look up contact information for users from whom John obtained updates to Dragons of the Misty Mountains.

Proactive application 504 may call or send a message to a past participant or the participant's contact (block 710). Continuing with the preceding example, proactive application 504 may invoke communication function interface 502 to send voice messages to phone applications in user devices 202. If proactive application 504 is a game, proactive application 504 may play the role of one of the antagonists in the game, challenge the users to play, or even taunt the users for not playing the game. Alternatively, proactive application 504 may send a text message to John's friends who may or may not have played the game, indicating that John has been defeated by one of the antagonists in the game.

In another example, assume that proactive application 504 is an online sales program. Proactive application 504 may send email messages to users of devices 202 (e.g., purchasers), reminding the users of a sales event. In some instances, proactive application 504 may provide a discount or e-coupon via the email along with the reminders.

Proactive application 504 may determine whether the contacted device/person responds to the contact (block 712). For example, proactive application 504 may determine whether the contacted participant reengages proactive application 504 within a particular duration (e.g., purchases an online product one day after being contacted via an email message, plays the game within 10 minutes after being contacted via a phone call, etc.). A result of determining whether the contacted participant has responded to the contact as may be recorded as part of usage information.

Proactive application 504 may record usage information (block 714). For example, when the user of user device 202-x is interacting with proactive application 504, proactive application 504 may record the time of the interaction, specific actions that the user performed (e.g., kill an antagonist in a game), the location of user device 202-x, identities of other, networked participants at other user devices 202, whether the user is interacting with proactive application 504 in response to the contact from proactive application 504, etc. The usage information may be stored at usage information database 508.

Example

Figure 8:
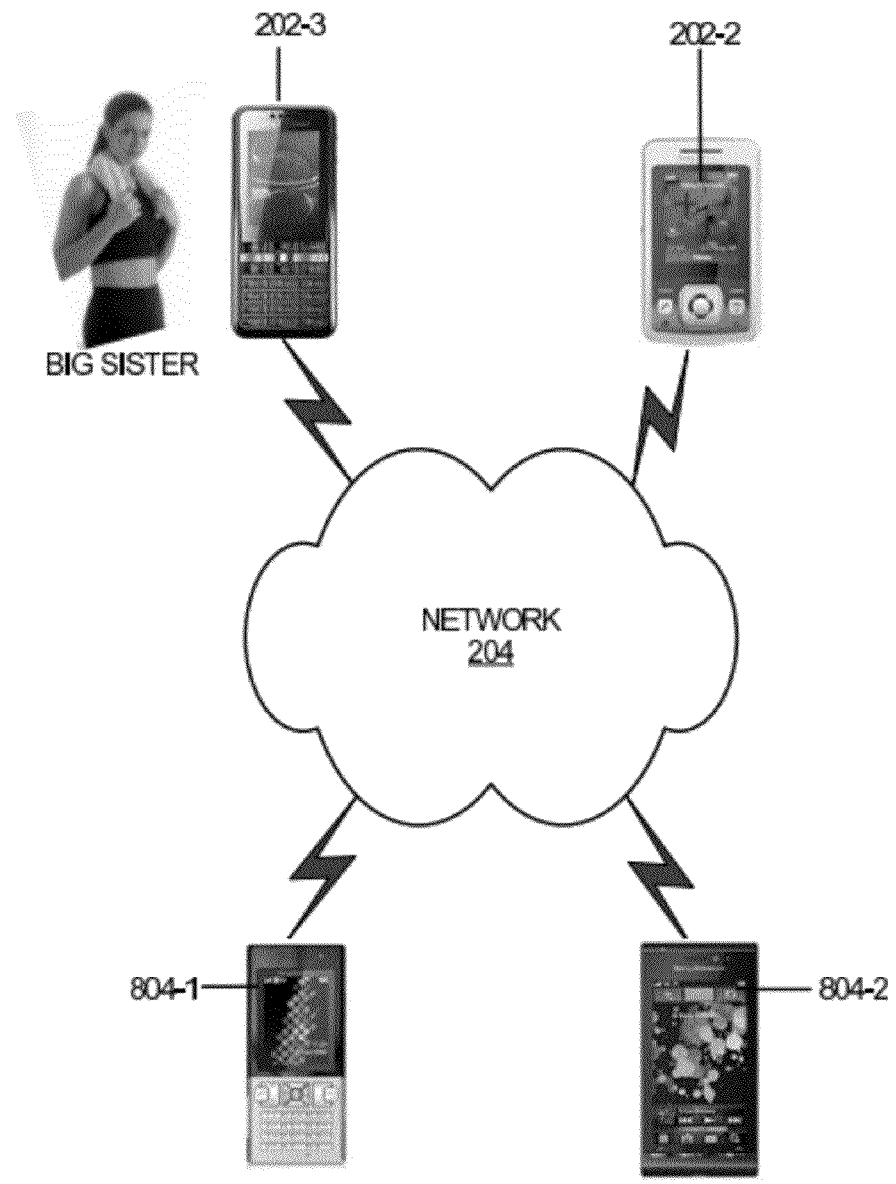
FIG. 8 illustrates an example associated with the process of FIG. 7.

FIG. 8 illustrates an example that is associated with proactive application 504. The example is consistent with the above descriptions. Assume that a Freaky Brains server is installed on server device 206-1, and that Freaky Brains clients are installed on Scott's user device 202-3, Johan's user device 202-2, Becky's user device 804-1, and Sam's user device 804-2. In addition, assume that Scott, Johan, Becky, and Sam played Freaky Brains over network 204 on Saturday 7:30 p.m. to 10:30 p.m.

Freaky Brains client runs in the background at Scott's device 202-3, and periodically obtains the state of user device 202-3. On Saturday morning, Freaky Brains client on Scott's device 202-3 compares the current time and location of device 202-3 to the time and location of Scott's previous gaming session. Based on the comparison, Freaky Brains client asks Scott if Scott will authorize Freaky Brains client to invite Johan, Becky, and Sam to a gaming session. Scott enjoys playing Freaky Brains, and, therefore, authorizes Freaky Brains client on device 202-3 to invite his friends.

Freaky Brains client performs a lookup of contact information for Johan, Becky, and Sam in Scott's address book on user device 202-3, and places a call to each of user devices 202-2, 804-1, and 804-2, posing as Big Sister, one of the characters in Freaky Brains. Each of Johan, Becky, and Sam receives a call at user devices 202-2, 804-1, and 804-2, respectively.

During each of the calls, Big Sister states, "I am the Big Sister, the smartest woman in Freaky Brains. I have defeated Scott by the score of 10-to-9. Now I challenge you to outwit me starting tonight at 7:30 p.m. Be ready to be stupefied!"

At 7:30 p.m., Scott, Johan, Becky, and Sam connect to Freaky Brains server on server device 206-1, and plays Freaky Brains. While Scott, Johan, Becky, and Sam play, Freaky Brain server and client on server device 206-x and user devices 202-3, 202-2, 804-1, and 804-2 record usage information.

CONCLUSION

The foregoing description of implementations provides illustration, but is not intended to be exhaustive or to limit the implementations to the precise form disclosed. Modifications and variations are possible in light of the above teachings or may be acquired from practice of the teachings.

For example, while series of blocks have been described with regard to the exemplary processes illustrated in FIG. 7, the order of the blocks may be modified in other implementations. In addition, non-dependent blocks may represent acts that can be performed in parallel to other blocks. Further, depending on the implementation of functional components, some of the blocks may be omitted from one process.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

It should be emphasized that the term "comprises/comprising" when used in this specification is taken to specify the presence of stated features, integers, steps or components but does not preclude the presence or addition of one or more other features, integers, steps, components, or groups thereof.

Further, certain portions of the implementations have been described as "logic" that performs one or more functions. This logic may include hardware, such as a processor, a microprocessor, an application specific integrated circuit, or a field programmable gate array, software, or a combination of hardware and software.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A device comprising:
    a contact information database; and
    a processor to:
        interact with a participant in a session with an application,
        obtain information that is associated with the session,
        generate a message based on the obtained information after the session terminates,
        obtain a list of contacts that includes at least one of the participant and members in the contact information database, and
        send the message to at least one of members in the contacts,
    wherein the message indicates at least a challenge to each of the at least one of members to defeat a character in a future session.

2. The device of claim 1, wherein the message includes at least one of:
    an audio clip, a video clip, a text message, or an email.

3. The device of claim 1, wherein the device includes:
    a game console, a netbook, a laptop, a personal computer, or a server device.

4. The device of claim 1, wherein the device includes:
    a cellular telephone or a personal digital assistant, and
    wherein the contact information database includes at least one of an address book or a phone book.

5. The device of claim 1, wherein the contact information database includes at least one of:
    a telephone number, an email address, a network address, or a uniform resource locator.

6. The device of claim 1, wherein the application includes at least one of:
    a game or an online order entry program.

7. The device of claim 1, wherein the message includes at least one of:
    a request for each of the at least one of members to join the future session;
    a description of how the participant was defeated by a character in a role playing game;
    a description of a type of product that the participant purchased during the session; or
    an electronic discount coupon.

8. The device of claim 1, wherein the obtained information includes at least one of:
    an email address, a name of the character within the application, a time of the session, duration of the session, an outcome of the participant facing an obstacle in a game during the session, and a product description.

9. The device of claim 8, wherein before the processor sends the message, the processor is further configured to:
    select a time for sending the message based on the time of the session.

10. The device of claim 1, wherein before the processor sends the message, the processor is further configured to call a communication application program interface to send the message.

11. A method comprising:
    interacting with a participant in a first session with a game application installed on a device;
    obtaining information that is associated with the first session;
    generating a message based on the obtained information;
    obtaining a list of contacts based on at least one of a phone book of the participant or an address book of the participant;
    sending the message to at least one of the contacts, wherein the message indicates at least a challenge to each of the at least one of contacts to defeat a character in a future session.

12. The method of claim 11, further comprising:
    collecting, during the first session, at least one of state information of the game application or state information associated with the device; and
    determining whether to send the message to the at least one of the contacts, by comparing the collected state information to current state information of the device or the game application.

13. The method of claim 11, wherein generating the message includes:
    inserting a challenge or taunt inside the message.

14. The method of claim 11, wherein sending the message includes:
    sending an audio clip or a video clip.

15. The method of claim 11, wherein obtaining the information includes:
    obtaining a name of a character whose role the participant assumed during the first session.

16. The device of claim 1, wherein at least one of the members participates a past session associated with the application.

17. A computer-readable medium for storing computer executable instructions, the computer-executable instructions comprising instructions for:
    interacting with a participant in a session;
    obtaining information that is associated with the session;
    generating a message based on the obtained information after the session terminates; and
    presenting the message to the participant,
    wherein the message indicates at least a challenge to the participant to defeat a character in a future session.

18. The computer-readable medium of claim 17, wherein the session includes:
    a commercial transaction; or
    a gaming session.

19. The computer-readable medium of claim 17, wherein the instructions for sending the message includes instructions for at least one of:
    playing an audio clip or a video clip;
    displaying an email message, a text message, or a short messaging service (SMS) message; or
    emulating a phone call.

20. The computer-readable medium of claim 17, further comprising instructions for:
    collecting, during the session, state information of a device that includes the computer-readable medium; and
    comparing the collected state information to current state information to determine whether to present the message.

* * * * *